United States Patent
Jung et al.

(10) Patent No.: US 9,373,842 B2
(45) Date of Patent: Jun. 21, 2016

(54) COMPOUND, METHOD FOR PREPARATION OF THE SAME, AND LITHIUM SECONDARY BATTERY COMPRISING THE SAME

(71) Applicant: LG CHEM, LTD., Seoul (KR)

(72) Inventors: YoungHwa Jung, Daejeon (KR); Youngsun Choi, Daejeon (KR); Seung-Tae Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 24 days.

(21) Appl. No.: 14/501,645

(22) Filed: Sep. 30, 2014

(65) Prior Publication Data

US 2015/0017513 A1    Jan. 15, 2015

Related U.S. Application Data

(62) Division of application No. 13/398,581, filed on Feb. 16, 2012, now Pat. No. 8,889,319.

(30) Foreign Application Priority Data

Feb. 17, 2011    (KR) .................. 10-2011-0014166

(51) Int. Cl.
| | |
|---|---|
| *H01M 4/485* | (2010.01) |
| *H01M 10/0525* | (2010.01) |
| *C01G 55/00* | (2006.01) |
| *H01M 4/505* | (2010.01) |
| *H01M 4/525* | (2010.01) |
| *H01M 10/052* | (2010.01) |

(52) U.S. Cl.
CPC ............... *H01M 4/485* (2013.01); *C01G 55/00* (2013.01); *C01G 55/002* (2013.01); *H01M 4/505* (2013.01); *H01M 4/525* (2013.01); *H01M 10/052* (2013.01); *H01M 10/0525* (2013.01); *C01P 2002/52* (2013.01); *C01P 2002/72* (2013.01); *C01P 2002/77* (2013.01); *C01P 2006/40* (2013.01); *H01M 2220/20* (2013.01); *Y02E60/122* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2007/0184347 A1* | 8/2007 | Stux | ....................... | C01G 39/00 429/231.1 |
| 2010/0012886 A1* | 1/2010 | Ryu | .................... | H01M 4/1315 252/182.1 |

FOREIGN PATENT DOCUMENTS

KR    10 2005 0123147 A    12/2005

OTHER PUBLICATIONS

Johannes, M.D., et al; Electronic structures of Li-insertion materials: Li2RuO3 and RuO2; Physical Review B 77, 075124 (2008).*

(Continued)

*Primary Examiner* — Ula C Ruddock
*Assistant Examiner* — Scott J Chmielecki
(74) *Attorney, Agent, or Firm* — Birch, Stewart, Kolasch & Birch, LLP

(57) ABSTRACT

Disclosed are a novel compound, a method for preparing the same, and a lithium secondary battery comprising the same. More specifically, disclosed are a compound in which five $MO_6$ octahedrons are bonded to one another around one $MO_6$ octahedron such that the $MO_6$ octahedrons share a vertex, to form hollows and Li cations substituted instead of Na cations using an ion substitution method are present in the hollows, and a crystal structure thereof is not varied even upon intercalation and deintercalation of Li cations, a method for preparing the same, and a lithium secondary battery comprising the same as a cathode active material.

22 Claims, 6 Drawing Sheets
(3 of 6 Drawing Sheet(s) Filed in Color)

(56) References Cited

OTHER PUBLICATIONS

Krutzsch et al., "Spineliphasen in den Systemen Li1-xMnRuO4 Und Li1-xFeRuO4", J. of the Lee-Common Metals, vol. 118 (1986) pp. 123-134.

Regan et al., "Structure and magnetism of NaRu2O4 and Na2.7Ru4O9", J. of Solid State Chemistry, vol. 179 (2006) pp. 195-204.

Yamaura et al., "Spinel-to-CaFe2O4-Type Structural Transformation in LiMn2O4 under High Pressure", J. Am. Chem. Soc., vol. 128 (2006) pp. 9448-9456.

\* cited by examiner

COMPOUND, METHOD FOR PREPARATION OF THE SAME, AND LITHIUM SECONDARY BATTERY COMPRISING THE SAME

CROSS-REFERENCE TO RELATED APPLICATIONS

This application is a Divisional of copending application Ser. No. 13/398,581, filed on Feb. 16, 2012, which claims priority under 35 U.S.C. §119(a) to Application No. 10-2011-0014166, filed in the Republic of Korea on Feb. 17, 2011, all of which are hereby expressly incorporated by reference into the present application.

TECHNICAL FIELD

The present invention relates to a novel compound, a method for preparing the same and a lithium secondary battery comprising the same. More specifically, the present invention relates to a compound in which five $MO_6$ octahedrons are bonded to one another around one $MO_6$ octahedron such that the $MO_6$ octahedrons share a vertex, to form hollows, Li cations substituted instead of Na cations using an ion substitution method are present in the hollows, and a crystal structure thereof is not varied even upon intercalation and deintercalation of Li cations, a method for preparing the same, and a lithium secondary battery comprising the same as a cathode active material.

BACKGROUND ART

Technological development and increased demand for mobile equipment have led to a rapid increase in the demand for secondary batteries as energy sources. Recently, use of secondary batteries is realized as power sources of electric vehicles (EVs), hybrid electric vehicles (HEVs) and the like. Accordingly, a great research is focused on secondary batteries satisfying various requirements and, in particular, use of lithium secondary batteries with high energy density, high discharge voltage and superior output stability is increasing.

In particular, lithium secondary batteries used for electric vehicles have high energy density, exhibit great power within a short time and should be used under severe conditions for 10 years or longer, thus requiring considerably superior stability and long lifespan, as compared to conventional small lithium secondary batteries.

In addition, recently, a great deal of research is focused on use of lithium secondary batteries for power storage devices in which unusable power is converted into physical or chemical energy, stored and used as electric energy, as necessary.

Lithium secondary batteries used for large-capacity power storage devices should have high energy density and efficiency, and long lifespan, and in particular, should secure safety and reliability, since combustion or explosion during malfunction of systems may cause major accidents.

In this regard, conventional lithium secondary batteries generally utilize a lithium cobalt composite oxide having a layered structure for a cathode and a graphite-based material for an anode. However, such lithium cobalt composite oxide is disadvantageous in that cobalt used as a main element is extremely expensive and a layered structure is unsuitable for electric vehicles or large-capacity power storage devices in terms of safety in that it undergoes variation in volume due to repeated intercalation and deintercalation of Li cations and is deformed when half or more of the Li cations are deintercalated.

In addition, lithium cobalt composite oxide has a spinel structure having a 3-dimensional interstitial space and does not undergo variation in volume due to intercalation and deintercalation of Li cations, but manganese is eluted into an electrolyte solution due to the effect of the electrolyte solution during charge and discharge at high temperature and high current, thus disadvantageously deteriorating batter characteristics, and having a limitation of increase in capacity per unit weight due to small capacity per unit weight, as compared to lithium cobalt composite oxides or lithium nickel composite oxides. Accordingly, a great deal of research is focused on a novel cathode active material having other crystal structure.

For example, there is hollandite such as $\alpha$-$MnO_2$, as a tunnel structure having a 1-dimensional interstitial space. A great deal of research has focused on this material since stable intercalation and deintercalation of Li cations are thought to be possible in the tunnel.

However, metals having a large ion size such as barium (Ba) and cesium (Cs) stably constitute a hollandite structure, while a structure that does not contain these metals is relatively unstable and exhibits poor lifespan.

Accordingly, attempts to solve these problems by doping with transition metals such as Co have been made. In accordance with recent developments in nanotechnology, 1-dimensional path of Li cations can be further decreased, and such a tunnel structure is actively researched.

However, no satisfactory material has been developed to date.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that a compound that is prepared by substituting Na cations, that are present in hollows surrounded by $MO_6$ octahedrons, by Li cations using an ion substitution method has a novel composition and a crystal structure, hardly undergoes structural variation in spite of repeated intercalation and deintercalation of Li cations during charge and discharge and does not undergo structural deformation even during overcharge, thus considerably decreasing the risk of combustion and explosion of lithium secondary batteries. Based on this discovery, the present invention has been completed.

Accordingly, it is an aspect of the present invention to provide a novel compound, and in particular, Na—Li—Ru-based oxide, that maintains a stable crystal structure even upon intercalation and deintercalation of Li cations substituted in Na cation sites in the tunnel structure composed of $MO_6$ octahedrons, a method for preparing the same using an ion substitution method, and a cathode active material for a lithium secondary battery.

Technical Solution

In accordance with one aspect of the present invention, provided is a compound having a structure in which five $MO_6$ octahedrons are bonded to one another near to one $MO_6$ octahedron such that the $MO_6$ octahedrons share a vertex, to form hollows and Li cations are present in the hollows.

Specifically, the crystal structure may be a structure in which two or more S-shaped 3-dimensional skeletons in which $MO_6$ octahedrons are bonded to one another such that they share a vertex in a perpendicular direction are arranged in parallel and are bonded to one another such that they share a vertex. At this time, the number of the 3-dimensional skeletons is not particularly limited, but, in a specific embodiment, 100 3-dimensional skeletons are arranged in parallel, share a vertex and are boned to one another.

Accordingly, the compound according to the present invention does not interfere with intercalation and deintercalation of the lithium ions during charge and discharge, since Li cations are present in the tunnel structure of oxides firmly bonded by $MO_6$ octahedrons. The term "tunnel structure" refers to a hollow structure that enables easy exchange and insertion of ions, which means a passage (channel), enabling diffusion of Li cations.

In a non-limiting embodiment of the present invention, M is ruthenium (Ru), and the compound contains one or more compounds selected from compounds represented by the following formula 1.

$$Li_xNa_{1-x}Ru_{2-y}Me_yO_4 \quad (1)$$

wherein $0 \leq x \leq 1$;

$0 \leq y \leq 2$;

Me represents a metal or transition metal cation having an oxidation number of +2 to +4.

The compound of formula 1 may be prepared by inserting Li cations into an open tunnel formed when Na cations are removed from the tunnel structure composed of $RuO_6$ octahedrons using the ion exchange method described in detail below.

The value of x may be determined within a range of $0 \leq x \leq 1$. Here, a case in which x=0 means that the Na cations are not substituted by Li cations and a case in which x=1 means that 100% of Na cations are substituted by Li cations.

In the compound, Na cations and Li cations may coexist in the tunnel structure composed of $RuO_6$ octahedrons and Na cations and Li cations move into the tunnel. Accordingly, 100% of Na cations can be substituted by Li cations while maintaining a stable structure without affecting crystal structures composed of $RuO_6$ octahedrons.

In addition, in formula 1, a part of Ru may be substituted by another transition metal or metal element (Me) having an oxidation number of +2 to +4. In a non-limiting example, the transition metal or metal element (Me) is at least one selected from the group consisting of Al, Mg, Ti, Fe Co, Ni and Mn. In this case, a preferred substituted amount may be $0<y\leq1$.

In addition, in Formula 1, oxygen ions may be substituted by anions (A) having an oxidation number of −1 or −2, and substitution of these anions enhances bonding force of transition metals or the like and prevents structural transition of compounds. At this time, the compound may be represented by the following Formula 2.

$$Li_xNa_{1-x}Ru_{2-y}Me_yO_{4-z}A_z \quad (2)$$

wherein $0 \leq x \leq 1$;

$0 \leq y \leq 2$;

$0 \leq z \leq 0.1$;

Me is a metal or transition metal cation having an oxidation number of +2 or +4; and A represents an anion having an oxidation number of −1 or −2.

The anion (A) is preferably at least one selected from the group consisting of halogens such as F, Cl, Br and I, S and N.

In addition, the present invention provides a cathode active material for a lithium secondary battery comprising at least one compound selected from Formula 1 or 2.

The Na—Li—Ru-based oxide maintains a basic skeletal structure, thus being free of structural variation regardless of movement of Li cations and causing no structural deformation in conventional cathode active materials in spite of overcharging and complete discharge.

Overcharge means a state that excess lithium ions are removed from the cathode active material during charging. In such an overcharged state, batteries are exposed to high temperatures, a reaction in which $O_2$ is separated from crystals occurs. The reaction causes deformation of crystals and generation of heat, thus causing a further increase in temperatures of batteries and as a result, resulting in a vicious circle in which $O_2$ is separated again.

On the other hand, the compound of Formula 1 constituting the cathode active material of the present invention does not undergo structural deformation in conventional cathode active materials even during overcharge. Accordingly, the compound of Formula 1 is suitable for use in lithium secondary batteries for electric vehicles or large-capacity power storage devices that require high energy density and efficiency, and long lifespan and, furthermore, require a considerably high level of safety and reliability in order to prevent combustion or explosion upon malfunctions of systems upon high function and large capacity.

In this regard, referring to Formula 1, in a case in which x=0, the compound is $NaRu_{2-y}Me_yO_4$ in which lithium ions are not present in a cathode. Such a completely charged state corresponds to an overcharge state in the conventional cathode active material.

Generally, in $LiCoO_2$ having a layered structure generally used as a cathode active material, when all lithium ions of the cathode move to the anode, the structure of $LiCoO_2$ is deformed and $LiCoO_2$ having a layered structure enabling reversible intercalation and deintercalation of lithium ions cannot be present On the other hand, in the compound of the present invention, $NaRu_{2-y}Me_yO_4$ in which lithium ions are not present at all can maintain a stable tunnel structure and does not undergo structural variation of oxides regardless of movement of lithium ions, and does not undergo structural variation even when completely charged state, that is, an overcharged state in a conventional cathode active material. Meanwhile, a case in which x=1 is a state of $LiRu_{2-y}Me_yO_4$ in which lithium ions are completely filled in terms of crystal structure. Lithium secondary batteries are charged when lithium ions of a cathode move to an anode and are discharged when the lithium ions of the anode move to the cathode. Accordingly, a case of x=1 means a completely discharged state.

Accordingly, in this case, all of a great number of lithium ions can be moved to the anode and high charge efficiency can thus be exerted.

As mentioned above, in the compound of Formula 1, Ru and O may be substituted by a transition metal and halogen, respectively. The substitution of anions improves bonding force of transition metals and the like and prevents structural transition of the compound, thus improving battery lifespan.

On the other hand, in Formula 2, when an amount of substituted anion (A) is excessively great (z>0.1), oxide cannot maintain a stable tunnel structure, thus disadvantageously causing a deterioration in lifespan.

Lithium secondary batteries using the compound according to the present invention do not undergo structural variation of oxides even upon repeated charge and discharge and do not undergo structural deformation when overcharged, thus securing safety and being effective in use as power sources of vehicles, large-capacity power storage devices and the like.

Specifically, lithium secondary batteries are stable since the structure of oxide is not varied regardless of movement of lithium ions even during repeated charge and discharge. Such a behavior is considerably distinguished from that of lithium transition metal oxide having a layered structure such as $LiCoO_2$ and $LiNiO_2$.

A method for preparing the compound of Formula 1 or 2 is not particularly limited and a preferred embodiment thereof will be described below.

First, a Na compound and a Ru-based oxide are mixed at a stoichiometric ratio in a powder state, Na—Ru-based oxide was then synthesized under an inert atmosphere at a temperature of 800 to 1100° C. for 10 to 14 hours, the synthesized product was mixed with a Li compound, and the mixture was inserted into a deferent duct, sealed and reacted at a temperature of 300 to 700° C. for 10 to 14 hours to synthesize a Na—Li—Ru-based oxide.

Here, the Li compound may be represented by LiX and X is an element having an oxidation number of −1. For example, the LiX is preferably selected from the group consisting of LiI, LiCl and $LiNO_3$.

In the cathode active material, $Na_xLi_{1-x}Ru_2O_4$ ($0 \le x \le 1$), in a case in which Ru is substituted by a transition metal (Me) or the like, or oxygen (O) is substituted by halogen or the like, the material may be prepared by adding the resulting compound prior to high-temperature reactions.

If necessary, the cathode active material of the present invention may further contain, in addition to the compound of Formula 1 or 2, other lithium-containing transition metal oxides.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of formula $Li_{1+y}Mn_{2-y}O_4$ ($0 \le y \le 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \le y \le 0.3$); lithium manganese composite oxides of Formula $LiMn_{2-y}M_yO_2$ (M=Co, Ni, Fe, Cr, Zn or Ta, and $0.01 \le y \le 0.1$), or formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The present invention provides a cathode for a lithium secondary battery wherein the cathode active material is applied to a collector. A method for preparing a cathode comprising the cathode active material according to one embodiment of the present invention will be described in detail.

A laminate-shaped electrode may be fabricated by adding the cathode active material of the present invention, 1 to 20% by weight of a binder and a conductive material with respect to the cathode active material to a dispersion, followed by stirring to prepare a paste, and applying the paste to a metal sheet for a current collector, followed by pressing and drying.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

Any conductive material may be used without particular limitation so long as it has suitable conductivity without causing adverse chemical changes in the battery. Examples of suitable conductive materials include graphite such natural graphite and artificial graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company), DENKA BLACK (available from Denka Singapore Private Limited), products available from Gulf Oil Company, Ketjen black, EC series (available from Armak Company), Vulcan XC-72 (available from Cabot Company) and Super P (Timcal Co.).

The filler may be added as necessary. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Representative examples of the dispersion solvent that can be used in the present invention may include isopropyl alcohol, N-methyl pyrrolidone (NMP) and acetone.

Uniform application of the paste of electrode materials to a metal material may be carried out by conventional methods known in the art or appropriate novel methods, taking into consideration characteristics of materials to be used. For example, preferably the electrode paste is distributed onto the current collector and is then uniformly dispersed thereon using a doctor blade. Where appropriate, distribution and dispersion of the electrode paste may also be performed in a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination.

Drying of the paste applied over the metal plate is preferably carried out in a vacuum oven at 50 to 200° C. for 1 to 3 days.

Further, the present invention provides a lithium secondary battery comprising an electrode assembly in which the above-fabricated cathode and an anode face each other such that a separator is interposed therebetween, and a lithium salt-containing, non-aqueous electrolyte.

The anode is, for example, fabricated by applying an anode active material to an anode current collector, followed by drying. If desired, the anode may further optionally include other components such as a conductive material, a binder and a filler, as described above.

For example, the anode is prepared by applying an anode mix comprising an anode active material to an anode current collector, followed by drying. The anode mix may comprise the afore-mentioned ingredients, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode materials utilizable in the present invention include carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogen atoms; $0 < x \leq 1$; $1 \leq y \leq 3$; and $1 \leq z \leq 8$); lithium metals; lithium alloys; silicon based alloys; tin based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or kraft papers made of an olefin polymer such as polypropylene and/or glass fibers or polyethylene, which have chemical resistance and hydrophobicity, are used Typical examples of commercially available products for the separator may include Celgard series such as Celgard$^R$ 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and electrolyte.

The lithium salt-containing non-aqueous electrolyte is composed of a non-aqueous electrolyte and lithium. As the non-aqueous electrolyte, a non-aqueous electrolytic solution, organic solid electrolyte and inorganic solid electrolyte may be utilized.

Examples of the non-aqueous electrolytic solution that can be used in the present invention include non-protic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention, mention include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention, mention include nitrides, halides and sulphates of lithium such as $Li_3N$, $LiI$, $Li_5NI_2$, $Li_3N$—$LiI$—$LiOH$, $LiSiO_4$, $LiSiO_4$-$LiI$-$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-ethlene carbonate (FEC) and the like.

As can be seen from the following examples and test examples, the lithium secondary batteries according to the present invention exhibit superior lifespan and safety, and in particular, are preferably used as batteries constituting medium and large battery modules. Accordingly, the present invention provides medium and large battery modules comprising the secondary battery as a unit cell, and medium and large battery packs comprising the same.

The medium and large battery modules and the battery pack are preferably used as power sources such as electric vehicles and hybrid electric vehicles, requiring high power and large capacity, as well as large-capacity power storage devices in which it is important to secure safety and reliability associated with high power and large capacity.

Accordingly, the present invention provides a device using the battery pack as a power source and, specifically, the battery pack may be used as a power source of electric vehicles (EVs), hybrid electric vehicles (HEVs), plug-in hybrid electric vehicles (PHEVs), or power storage devices.

The configurations of medium and large battery modules and battery packs, and fabrication methods thereof are well-known in the art and a detailed explanation thereof is thus omitted in this specification.

Effects of the Invention

As apparent from the afore-going, in the compound according to the present invention, intercalation and deintercalation of Li cations occur in the tunnel structure composed of $MO_6$ (specifically, $RuO_6$) octahedrons, thus maintaining a crystal structure of compounds without structural variation and deformation.

Accordingly, when the compound is used as a cathode active material for a lithium secondary battery, the lithium secondary battery does not undergo structural deformation upon repeated over-charge, thus securing safety and thus being useful as power sources of electric vehicles, large-capacity power storage devices and the like.

In addition, a method for preparing the compound according to the present invention by substituting Na cations and Li cations in Na-Ru-based oxide advantageously enables easy substitution of Na and Li cations and formation of a channel of Li cations while maintaining structural stability of oxide through movement of these cations.

BRIEF DESCRIPTION OF THE DRAWINGS

The patent or application file contains at least one color drawing. Copies of this patent or patent application publication with color drawing will be provided by the USPTO upon request and payment of the necessary fee.

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only to illustrate the present invention and should not be construed as limiting the scope and spirit of the present invention.

EXAMPLE 1

Figure 1:
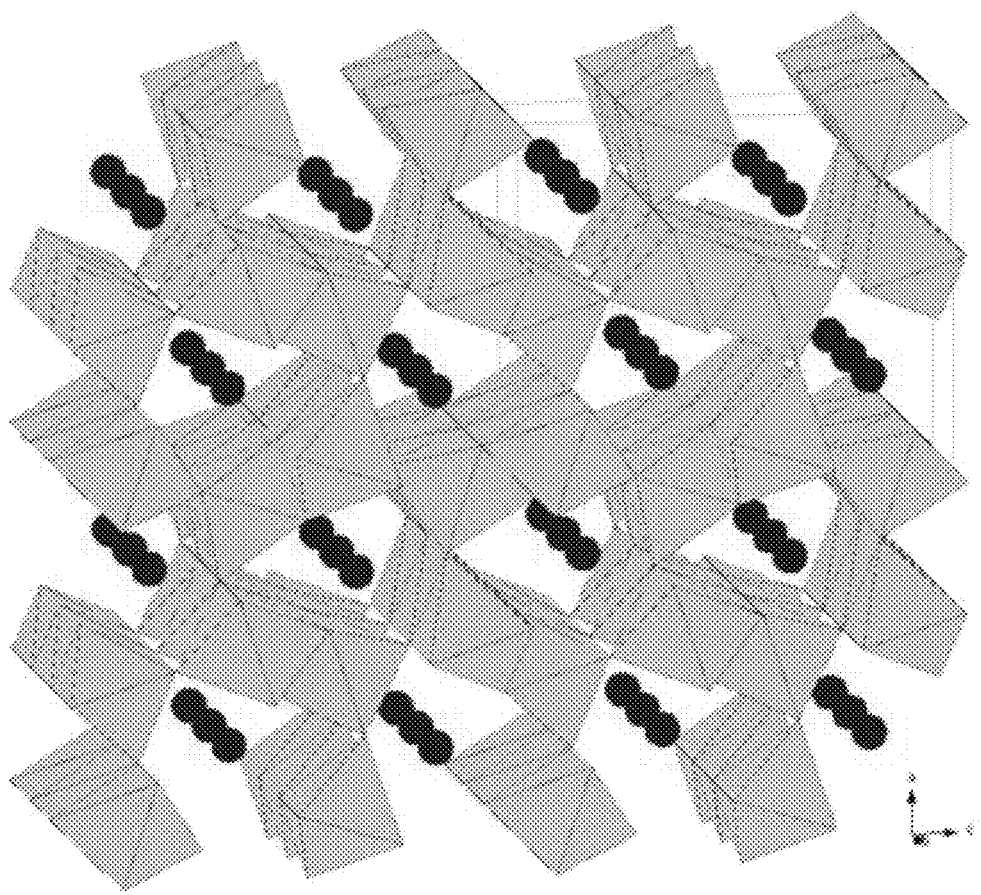
FIG. 1 is a perspective view schematically illustrating the structure of $NaRu_2O_4$.
Figure 2:
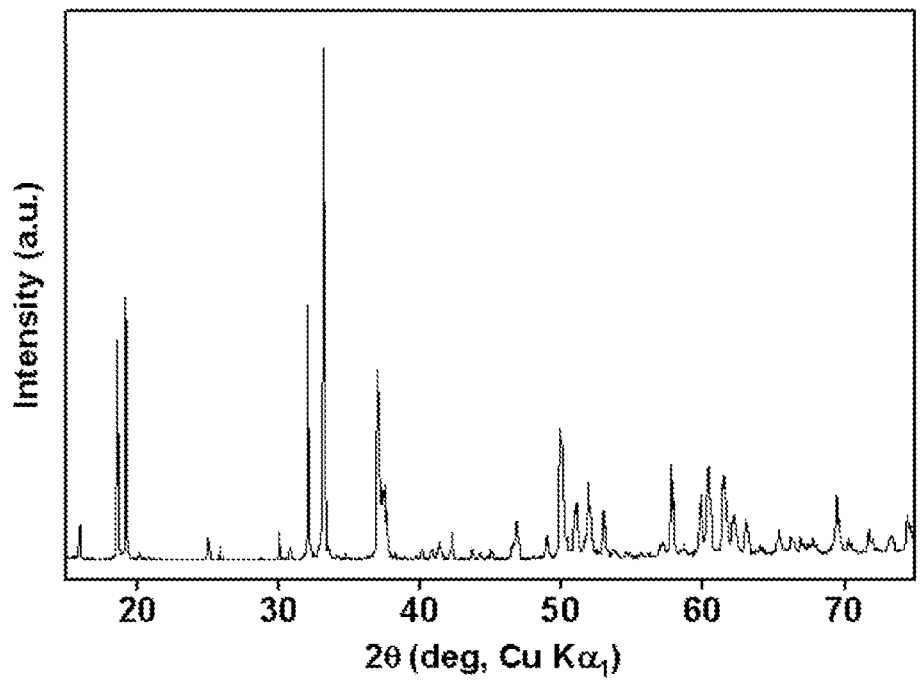
FIG. 2 is an XRD pattern graph of synthesized $NaRu_2O_4$.

$Na_2CO_3$ and $RuO_2$ weighed at a stoichiometric ratio were baked under an Ar atmosphere at a temperature of 950° C. for 12 hours, to synthesize $NaRu_2O_4$, and structure and XRD analysis results of the resulting product were shown in FIGS. 1 and 2. FIG. 1 schematically shows a crystal structure of $NaRu_2O_4$.

Referring to FIG. 1, the compound of Formula 1 has a structure in which $RuO_6$ octahedrons are continuously firmly bonded to one another and Na cations are present therebetween.

Specifically, the compound has a structure in which $RuO_6$ octahedrons form S-shaped endless chains in an a-axis direction (vertical direction), the endless chains are arranged in parallel with respect to another endless chains in a b-axis direction and a c-axis direction, and are cross-linked and one Na cation is arranged in a region provided in the cross-linkage.

That is, it is thought that $RuO_6$ octahedrons constitute a 3-dimensional framework and Li cations are substituted in Na cation sites in the 1-dimensional tunnel formed by the octahedrons. It can be seen that FIG. 2 shows XRD diffraction patterns of the synthesized $NaRu_2O_4$ which correspond to XRD diffraction patterns of known $NaRu_2O_4$.

EXAMPLE 2

The synthesized product of Example 1, $NaRu_2O_4$ was mixed with LiI the mixture was added to a deferent duct, sealed under vacuum, and reacted at a temperature of 460° C. for 12 hours to synthesize $Li_xNa_{1-x}Ru_2O_4$.

Figure 3:
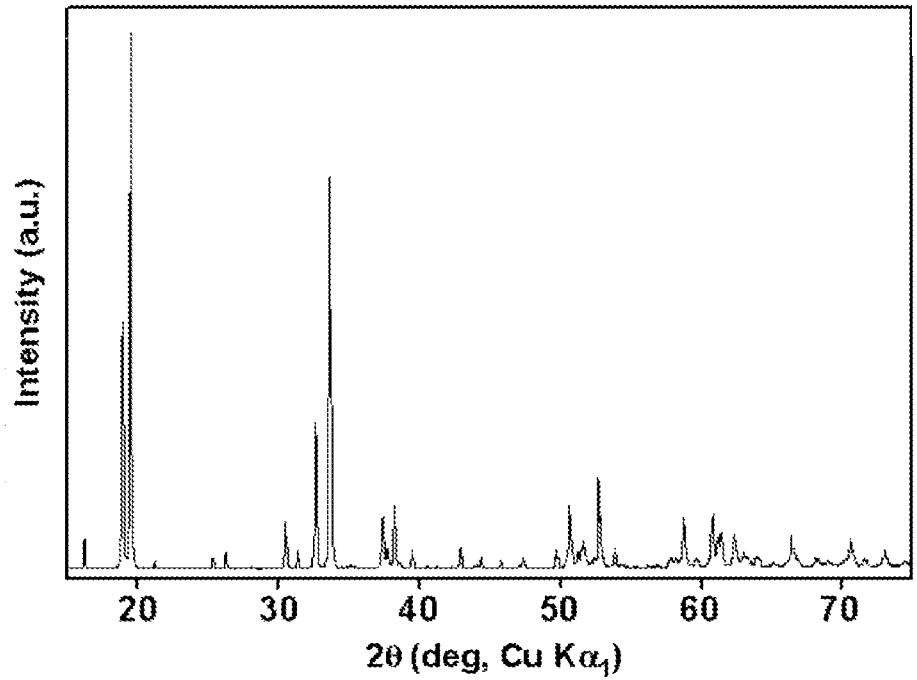
FIG. 3 is an XRD pattern graph of $Li_xNa_{1-x}Ru_2O_4$ prepared by an ion substitution method.

FIG. 3 shows an XRD pattern graph of the compound according to the present invention prepared by an ion substitution method. In the following Table 1, results of cell parameter measured through Rietveld refinement before and after substitution of Li cations are suggested.

TABLE 1

|       | $NaRu_2O_4$ | $Li_xNa_{1-x}Ru_2O_4$ |
|-------|-------------|------------------------|
| a [Å] | 9.2748(2)   | 9.1296(2)              |
| a [Å] | 2.8316(2)   | 2.8049(2)              |
| a [Å] | 11.163(1)   | 11.001(1)              |

As can be seen from Table 1 above, a decrease in cell parameter means partial substitution of Li cations and, it can be seen from results of XRD diffraction pattern analysis through Rietveld refinement that occupancy of Li was 1. In addition, as a result of ICP element assay, a molar ratio of Li and Na was 140:1, which means that, as a result of the test, 100% of Li was substituted.

EXAMPLE 3

Oxide prepared in Example 2, the lithium ruthenium oxide, as a cathode active material, denka black as a conductive material and KF 1100 as a binder were mixed at a ratio of 8:1:1 (weight ratio), and stirred together with NMP, as a solvent, followed by coating the mixture on an aluminium foil, as a metal current collector. The coating was dried in a 130° C. vacuum oven for 2 or more hours, to fabricate a cathode.

A coin-type battery was fabricated using a Li metal and a polypropylene porous separation membrane, as the cathode and an anode, and a solution containing 1M lithium hexafluorophosphate ($LiPF_6$), in which ethylene carbonate (EC) and ethylene methyl carbonate (EMC) are dissolved at a volume ratio of 1:2, as an electrolyte solution.

With respect to the fabricated coin-type battery, electrochemical properties of the cathode active material were evaluated using an electrochemical analyzer (VMP, Bio-Logic-Science Instruments). A test was performed within a range of 2.5 to 4.0V at a scanning rate of 0.5 mV/s using cyclic voltammetry (CV). The results are shown in FIG. 4.

Figure 4:
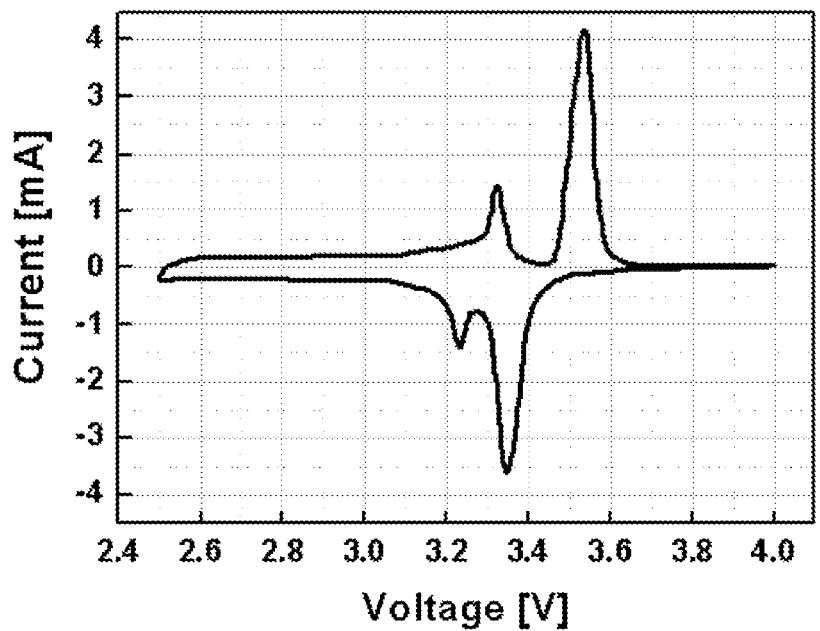
FIG. 4 shows cyclic voltammetry data of $Li_xNa_{1-x}Ru_2O_4$ prepared by an ion substitution method.

As can be seen from FIG. 4, Li cations were reversibly intercalated into and deintercalated from the lithium ruthenium oxide according to the present invention. In addition, referring to the following FIGS. 5 to 7, Li cations have an electric potential region of about at 3.4 V. This means that Li cations are intercalated and deintercalated in a region of 3.4 V.

EXAMPLE 4

The fabricated coin-type battery was subjected to CC charge and discharge at a 0.1C-rate in a region of 2.7 to 4.0V.

Figure 5:
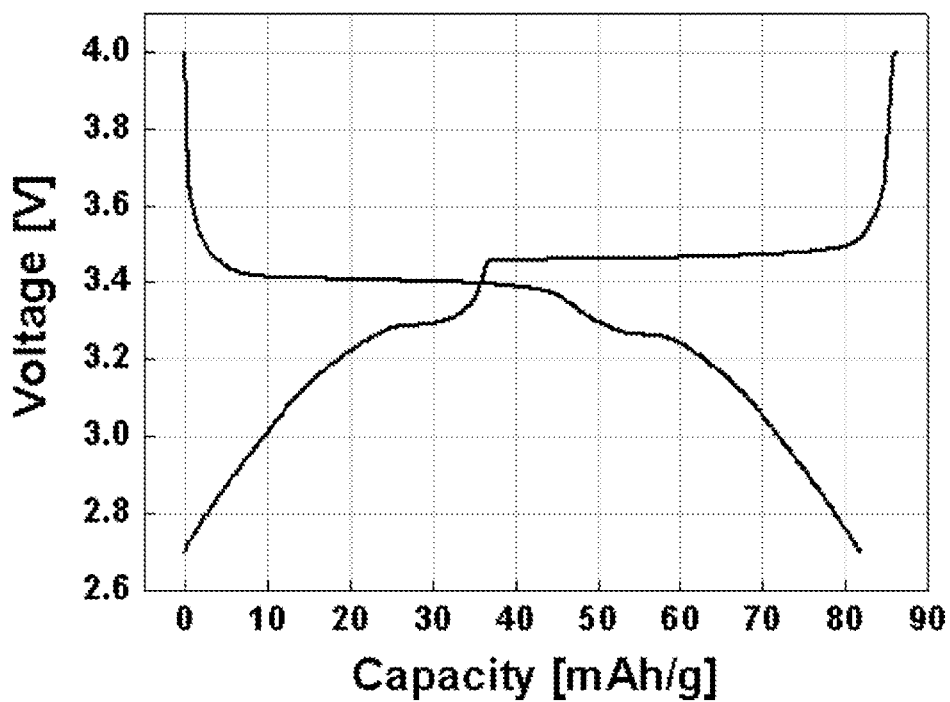
FIG. 5 shows CC charge/discharge profiles of lithium ion batteries.

The results are shown in FIG. 5. As can be seen from FIG. 5, a novel active material, LiRu$_2$O$_4$ in which 100% of Li is substituted exhibits a discharge capacity of about 82 mAh/g and an average voltage of 3.3 V. It can be seen that oxidation-reduction peaks in CV match with voltages in charge/discharge profiles (theoretical capacity of 98 Mah/g).

Figure 6:
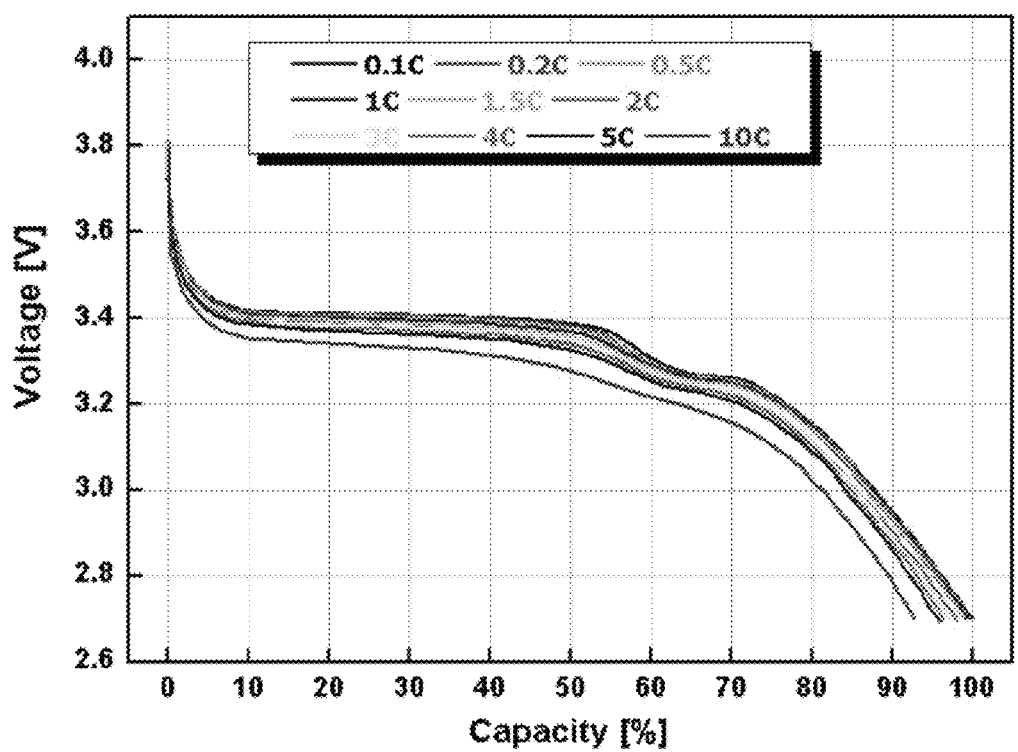
FIG. 6 is a discharge pattern graph at respective Grates of lithium ion batteries.

From the test results of discharge capacity at respective C-rates shown in FIG. 6, decreases in IR drop and capacity are considerably small even at a high rate of 10C. This indicates that a 1-dimensional structure, a tunnel structure, is stably maintained and lithium ions can be thus moved at a high rate.

In addition, this behavior is different from the fact that rate properties of conventional 1-dimensional structures are deteriorated unless the 1-dimensional structures have a nano-size. The reason for this is thought to be that the electrical conductivity of LiRu$_2$O$_4$ is better than that of the cathode active material of conventional 1-dimensional structures.

Figure 7:
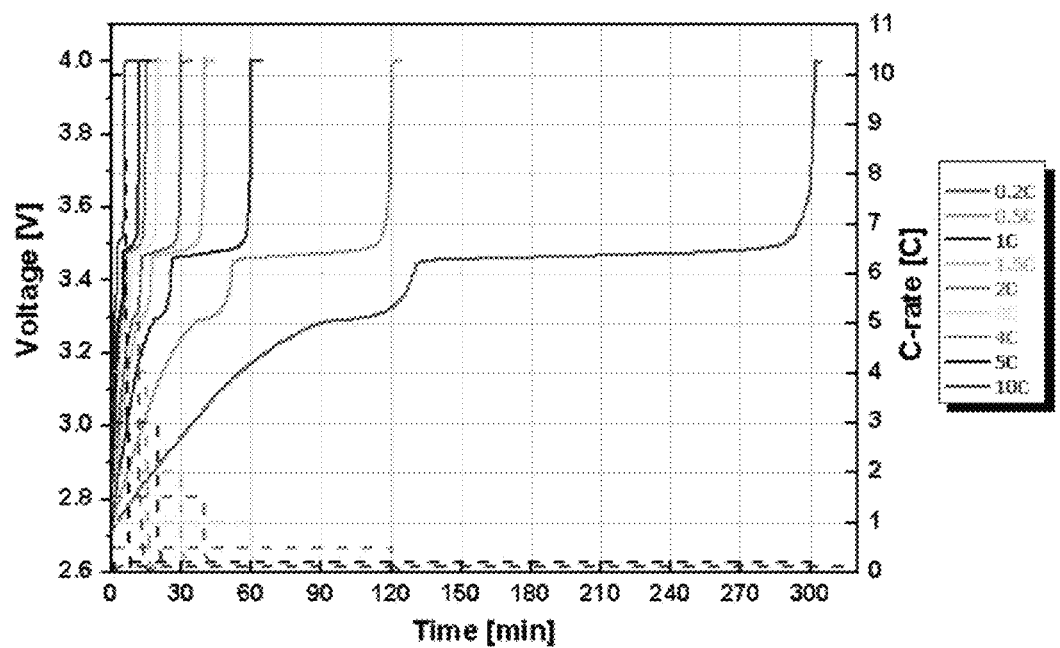
FIG. 7 is a charge pattern graph at respective Grates of lithium ion batteries.

From test results of charge capacity at respective C-rates shown in FIG. 7, even during charge at a high rate, the battery exhibits considerably superior performance, as compared to conventional layered structures, thus advantageously being applicable to battery systems requiring high power. Test results of charge capacity at respective Grates are shown in Table 2.

TABLE 2

| LiRu$_2$O$_4$ | 0.1 C | 0.2 C | 0.5 C | 1 C | 1.5 C | 2 C | 3 C | 4 C | 5 C | 10 C |
|---|---|---|---|---|---|---|---|---|---|---|
| Time (min) | 610 | 302 | 120 | 60 | 40 | 30 | 20 | 15 | 12 | 6 |
| Capacity (mAh/g) | 81.2 | 80.4 | 80.3 | 79.9 | 79.7 | 79.4 | 79.2 | 78.9 | 79.0 | 77.7 |
| Ratio (%) | 100.0 | 99.0 | 98.9 | 98.4 | 98.2 | 97.8 | 97.5 | 97.2 | 97.3 | 95.7 |

Figure 8:
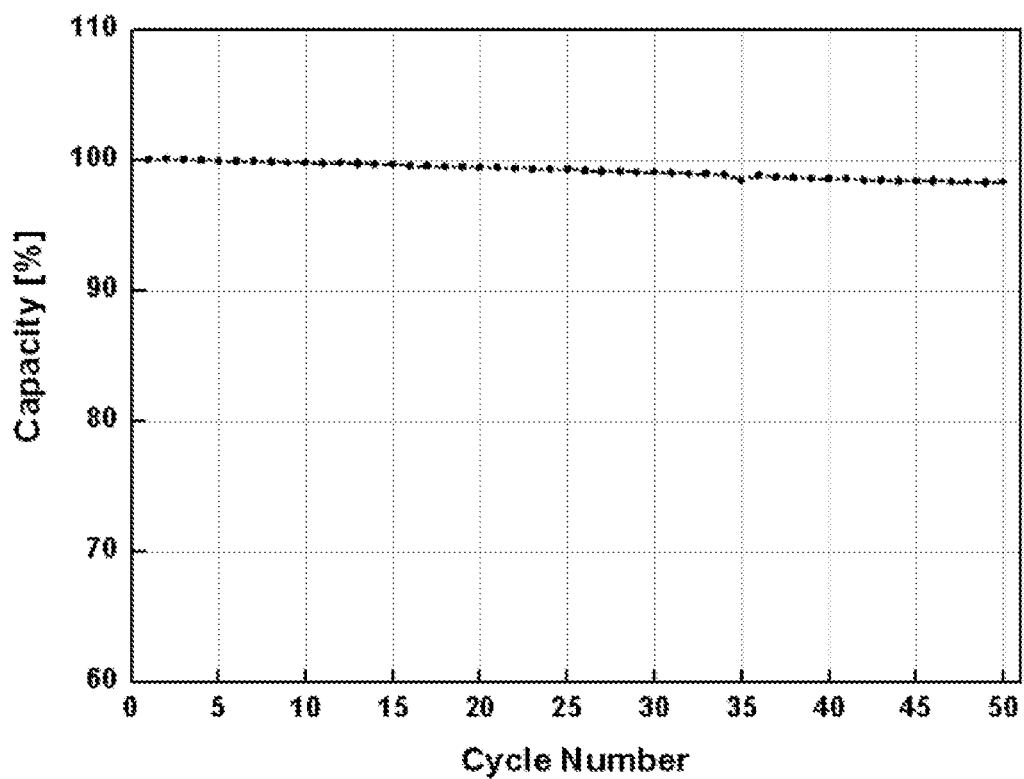
FIG. 8 is a cycle pattern graph of lithium ion batteries charged and discharged at 0.5C-rate.

In addition, as can be seen from FIG. 8, the material exhibits a capacity decrease of 2% or less at 50 cycles, which means that the material is stable in terms of long-term lifespan.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary battery comprising at least one compound selected from compounds represented by the following Formula 1:

     (1)

$$Li_xNa_{1-x}Ru_{2-y}Me_yO_4$$

wherein
0<x≤1;
0<y≤2;
Me is a metal or transition metal cation having an oxidation number of +2 to +4, and
wherein the compound has a crystal structure in which five RuO$_6$ octahedrons are bonded to one another around one RuO$_6$ octahedron such that the RuO$_6$ octahedrons share a vertex, to form hollows and Na cations and Li cations coexist in the hollows.

2. The cathode active material according to claim 1, wherein x is 1.

3. The cathode active material according to claim 1, wherein Me is at least one selected from the group consisting of Al, Mg, Ti, Fe, Co, Ni and Mn.

4. The cathode active material according to claim 1, wherein the oxygen ion of Formula 1 is substituted by an anion (A) having an oxidation number of −1 or −2.

5. The cathode active material according to claim 4, wherein the compound is represented by the following formula 2:

     (2)

$$Li_xNa_{1-x}Ru_{2-y}Me_yO_{4-z}A_z$$

wherein
0<x≤1;
0<y≤2;
0≤z≤0.1;
Me is a metal or transition metal cation having an oxidation number of +2 to +4; and
A is an anion having an oxidation number of −1 or −2.

6. The cathode active material according to claim 5, wherein A is at least one selected from the group consisting of halogen, S and N.

7. A cathode for a lithium secondary battery in which the cathode active material according to claim 1 is applied to a current collector.

8. A lithium secondary battery comprising the cathode according to claim 7.

9. A battery module comprising the lithium secondary battery according to claim 8 as a unit cell.

10. A battery pack comprising the battery module according to claim 9.

11. A device using the battery pack according to claim 10 as a power source.

12. The device according to claim 11, wherein the device is an electric vehicle, a hybrid electric vehicle, a plug-in hybrid electric vehicle or a power storage device.

13. A method for preparing the compound represented by the following Formula 1 by mixing a Li compound with Na-Ru-based oxide and reacting the compound at a temperature of 300 to 700° C. for 10 to 14 hours by an ion substitution method:

     (1)

$$Li_xNa_{1-x}Ru_{2-y}Me_yO_4$$

wherein
0<x≤1;
0<y≤2;
Me is a metal or transition metal cation having an oxidation number of +2 to +4, and
wherein the compound has a crystal structure in which five RuO$_6$ octahedrons are bonded to one another around one RuO$_6$ octahedron such that the RuO$_6$ octahedrons share a vertex, to form hollows and Na cations and Li cations coexist in the hollows.

14. The method according to claim 13, wherein the Na—Ru-based oxide is NaRu$_2$O$_4$.

15. The method according to claim 14, wherein NaRu$_2$O$_4$ is synthesized by mixing Na$_2$CO$_3$ with RuO$_2$, and baking the mixture under an Ar atmosphere at a temperature of 800 to 1100° C. for 10 to 14 hours.

16. The method according to claim 13, wherein the Li compound is LiX (in which X is an element having an oxidation number of −1).

17. The method according to claim 16, wherein LiX is selected from the group consisting of LiI, LiCl and LiNO$_3$.

18. The method according to claim 13, wherein x is 1.

19. The method according to claim 13, wherein Me is at least one selected from the group consisting of Al, Mg, Ti, Fe, Co, Ni and Mn.

20. The method according to claim 13, wherein the oxygen ion of Formula 1 is substituted by an anion (A) having an oxidation number of −1 or −2.

21. The method according to claim 13, wherein the compound is represented by the following formula 2:

$$Li_xNa_{1-x}Ru_{2-y}Me_yO_{4-z}A_z \quad (2)$$

wherein

0<x≤1;
0<y≤2;
0≤z≤0.1;

Me is a metal or transition metal cation having an oxidation number of +2 to +4; and A is an anion having an oxidation number of −1 or −2.

22. The method according to claim 21, wherein A is at least one selected from the group consisting of halogen, S and N.

* * * * *